(12) United States Patent
Cavnic

(10) Patent No.: US 12,291,269 B2
(45) Date of Patent: May 6, 2025

(54) ACCIDENT SAFETY DEVICE FOR A MOTOR VEHICLE, MOTOR VEHICLE AND METHOD FOR CONTROLLED CONVERSION OF IMPACT ENERGY BY MEANS OF AN ACCIDENT SAFETY DEVICE

(71) Applicant: Bayerische Motoren Werke Aktiengesellschaft, Munich (DE)

(72) Inventor: Predrag Cavnic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 312 days.

(21) Appl. No.: 17/919,388

(22) PCT Filed: Mar. 23, 2021

(86) PCT No.: PCT/EP2021/057428
§ 371 (c)(1),
(2) Date: Oct. 17, 2022

(87) PCT Pub. No.: WO2021/213763
PCT Pub. Date: Oct. 28, 2021

(65) Prior Publication Data
US 2023/0159105 A1 May 25, 2023

(30) Foreign Application Priority Data
Apr. 23, 2020 (DE) ............ 10 2020 111 101.0

(51) Int. Cl.
*B62D 21/15* (2006.01)
*B60K 1/04* (2019.01)
*B62D 25/02* (2006.01)

(52) U.S. Cl.
CPC ............ *B62D 21/157* (2013.01); *B60K 1/04* (2013.01); *B62D 25/025* (2013.01); *B60K 2001/0438* (2013.01)

(58) Field of Classification Search
None
See application file for complete search history.

(56) References Cited

U.S. PATENT DOCUMENTS 9,156,340 B2  10/2015  van den Akker
9,493,190 B1  11/2016  Alwan et al.
(Continued)

FOREIGN PATENT DOCUMENTS

CN   105829151 A   8/2016
CN   107074296 A   8/2017
(Continued)

OTHER PUBLICATIONS

International Search Report (PCT/ISA/210) issued in PCT Application No. PCT/EP2021/057428 dated May 14, 2021 with English translation (five (5) pages).
(Continued)

*Primary Examiner* — Faye M Fleming
(74) *Attorney, Agent, or Firm* — Crowell & Moring LLP

(57) ABSTRACT

An accident safety device for a motor vehicle includes two separate accident safety bodies which are spaced apart from each other by a predetermined distance and are fastenable opposite each other to a motor vehicle bodyshell. One of the accident safety bodies is fastenable to an underbody element of the motor vehicle body shell. Another of the accident safety bodies has a catch element which corresponds to the one accident safety body and is designed to block the two accident safety bodies from avoiding each other in the event of an accident of the motor vehicle. A motor vehicle is equipped with such an accident safety device and a method controls the conversion of impact energy into work of deformation by use of the accident safety device.

11 Claims, 6 Drawing Sheets

(56) References Cited

U.S. PATENT DOCUMENTS

| | | | |
|---|---|---|---|
| 9,758,029 | B2 | 9/2017 | Hokazono et al. |
| 11,370,287 | B2* | 6/2022 | Tsuyuzaki ............ B62D 21/157 |
| 2016/0347160 | A1 | 12/2016 | Landgraf |
| 2016/0375750 | A1 | 12/2016 | Hokazono et al. |
| 2017/0197663 | A1 | 7/2017 | Schuster et al. |
| 2017/0355255 | A1 | 12/2017 | Brausse et al. |
| 2020/0391798 | A1 | 12/2020 | Ebner et al. |
| 2024/0198778 | A1* | 6/2024 | Lee ...................... B62D 21/157 |
| 2024/0217328 | A1* | 7/2024 | Hahn .................. H01M 50/249 |

FOREIGN PATENT DOCUMENTS

| | | | |
|---|---|---|---|
| DE | 10 2010 050 826 A1 | 5/2012 | |
| DE | 10 2014 001 289 B3 | 5/2015 | |
| DE | 10 2015 117 466 A1 | 4/2017 | |
| DE | 10 2017 010 670 A1 | 5/2019 | |
| DE | 10 2018 200 454 A1 | 7/2019 | |
| KR | 20230108614 A * | 7/2023 | .............. B60K 1/04 |
| WO | WO 2015/074753 A1 | 5/2015 | |

OTHER PUBLICATIONS

German-language Written Opinion (PCT/ISA/237) issued in PCT Application No. PCT/EP2021/057428 dated May 14, 2021 (three (3) pages).

German-language Search Report issued in German Application No. 10 2020 111 101.0 dated Dec. 4, 2020 with partial English translation (nine (9) pages).

English translation of Chinese Office Action issued in Chinese Application No. 202180029411.1 dated May 30, 2023 (7 pages).

* cited by examiner

ACCIDENT SAFETY DEVICE FOR A MOTOR VEHICLE, MOTOR VEHICLE AND METHOD FOR CONTROLLED CONVERSION OF IMPACT ENERGY BY MEANS OF AN ACCIDENT SAFETY DEVICE

BACKGROUND AND SUMMARY

Modern motor vehicles, in particular passenger cars, which can be electrically driven or propelled, have an electric energy storage unit, for example a traction accumulator. In order to provide a particularly favorable center of gravity position of the correspondingly electrically drivable motor vehicle, the electric energy storage unit should be placed as low as possible in relation to the motor vehicle, for example on an underbody of the motor vehicle. This electric energy storage unit usually has a crash profile, in order to reduce particularly efficiently impact energy in the event of a crash, that is to say in the event of impact of the motor vehicle or the electric energy storage unit against an element of another entity involved in the accident. Such crash profiles usually extend laterally, that is to say along a vehicle transverse axis, outwardly on both sides, usually into a sill region of the motor vehicle.

In such conventional crash profiles or conventional sill covers, it may therefore be that a simple assembly or maintenance or repair of the conventional sill cover is at least hindered by the crash profile. In other words, there is a conflict of interest between particularly easy or efficient assembly/disassembly of the sill cover and a spatial extent of the crash profile of the electric energy storage unit reaching advantageously particularly far outward. If, for example, a fastening means of the sill cover, in particular of a side sill, is at least partially covered by the crash profile, a disassembly of the sill cover, for example, is only possible with a particularly high level of effort, since the crash profile would then firstly have to be disassembled, in order to be able to disassemble the sill cover particularly easily. Alternatively, it is nowadays provided, for example, to provide the crash profile with openings that allow a tool for example to be passed through to reach the corresponding fastening means of the sill cover. Stability of the crash profile, however, at least in the region of any such opening, is hereby reduced disadvantageously.

DE 10 2014 001 289 B3 discloses a motor vehicle in which battery modules are connected in a frictionally engaged manner to a vehicle underbody, wherein a force acting on a sill as the result of a side impact is converted by a displacement of the battery modules at least in part into a deformation.

Furthermore, DE 10 2010 050 826 A1 discloses an arrangement of at least one traction battery in an electrically driven motor vehicle, wherein deformation elements fixed to the vehicle or battery and impact-protection guards fixed to the vehicle or battery are used between sills and a lateral battery box and distribute evenly over an area any crash loads that occur there.

The object of the invention is to further increase the accident safety of a motor vehicle.

This object is achieved by an accident safety device, by a motor vehicle, and by a deformation method, in accordance with the independent claims. Features, advantages and advantageous embodiments of the accident safety device are to be considered as features, advantages and advantageous embodiments of the motor vehicle and of the deformation method, and vice versa. Features, advantages and advantageous embodiments of the motor vehicle are to be considered as features, advantages and advantageous embodiments of the method for controlled conversion of impact energy, and vice versa. Advantageous details of the invention are the subject of the dependent claims and the description.

An accident safety device according to the invention is provided for a motor vehicle, which in particular is configured as a passenger car. In particular, the motor vehicle is at least partly electrically drivable or propellable or accelerable, and therefore the motor vehicle then has an electric energy storage unit, which has an electric traction accumulator ("high-voltage store"). In motor operation of an electric drive unit of the motor vehicle, the electric traction accumulator provides electric energy to an electric motor of the electric drive unit, the electric energy being usable by means of the electric motor in order to accelerate the electrically drivable motor vehicle or to maintain a current driving speed. In generator operation of the electric drive unit, the electric motor provides electric energy to the electric traction accumulator, and the electric energy can be used to electrically (re)charge the electric traction accumulator.

The accident safety device furthermore has two separate accident safety bodies which are spaced apart from each other by a predetermined distance and are fastenable opposite each other to a motor vehicle body-in-white. This means that the accident safety bodies, in a state in which the accident safety device is fastened fully to the motor vehicle, are spaced apart from each other over the predetermined distance and are fastened opposite each other to the motor vehicle body-in-white. Both accident safety bodies are then arrangeable or arranged on a common motor vehicle side, that is to say on the right side or left side, and face one another. If it is thus intended to equip the motor vehicle on the right side and left side with an accident safety device of this kind, a total of at least four such accident safety bodies must then be provided along a vehicle transverse axis, wherein a first pair of accident safety bodies is arrangeable or arranged on the left side on the motor vehicle and a second pair of accident safety bodies is arrangeable or arranged on the right side on the motor vehicle.

One of the accident safety bodies is fastenable to an underbody element of the motor vehicle body-in-white or—in the case of the motor vehicle equipped with the accident safety device—is fastened to the underbody element. The underbody element is in particular a housing of the electric energy storage unit of the motor vehicle or the motor vehicle body-in-white, and the electric traction accumulator is fastenable or fastened to the motor vehicle body-in-white via the housing.

In order to now realize the accident safety of the motor vehicle, for example a particularly advantageous deformation behavior, by means of the accident safety device, it is provided in accordance with the invention that at least one of the accident safety bodies has a catch element which corresponds to the corresponding other of the accident safety bodies and is configured to block the accident safety bodies from avoiding each other in the event of an accident of the motor vehicle. This means that the accident safety bodies, in the event of an impact of an element of another entity involved in the accident, are caught on one another or are blocked against one another or with one another on the accident safety device by means of the catch element in such a way that the accident safety bodies are prevented from avoiding each other. For example, the accident safety bodies are thus prevented from moving past one another, twisting relative to one another, etc. as a result of the impact.

It is therefore advantageously ensured that an energy absorption axis of the accident safety device and an impact axis do not undesirably diverge from one another and that the energy absorption axis does not kink undesirably in the event of the impact. A deliberate, particularly long predefined deformation path is thus created, along which the impact energy can be reduced in a controlled manner at least in part, that is to say can be converted in a controlled manner into work of deformation. Accordingly, disadvantageously high or jerky accelerations, as occur in a crash situation, can be reduced particularly efficiently, whereby ultimately passenger protection and component protection are improved by means of the accident safety device.

The invention furthermore relates to a motor vehicle having an accident safety device that comprises two separate accident safety bodies which are spaced apart from each other over a predetermined distance and are fastened opposite one another to a motor vehicle body-in-white. One of the accident safety bodies is fastened here to an underbody element of the motor vehicle body-in-white, for example to a housing of an electric energy storage unit of the motor vehicle.

In order to now further improve the accident safety in a motor vehicle, one of the accident safety bodies in accordance with the invention has a catch element which corresponds to the other of the accident safety bodies and is configured to block the accident safety bodies from avoiding each other in the event of an accident of the motor vehicle.

In addition, the invention relates to a method for the controlled conversion of impact energy into work of deformation by means of an accident safety device in a motor vehicle equipped with such an accident safety device. In the method, an element of another entity involved in the accident and an external accident safety body of the accident safety device impact against one another. This means that the accident safety device has one of the accident safety bodies of the accident safety device on an outer side of the motor vehicle and the other of the accident safety bodies of the accident safety device is spaced apart from the outer accident safety body over the predetermined distance toward the center of the vehicle.

Due to the collision against one another of the element of another entity involved in the accident and the outer accident safety body, the latter is displaced at least substantially in translation in the direction of the opposite accident safety body of the accident safety device. The opposite accident safety body and the outer accident safety body face one another, wherein the opposite accident safety body—prior to the collision against one another—forms an inner accident safety body in relation to the outer accident safety body. During the displacement of the outer accident safety body toward the inner accident safety body, the predetermined distance between the accident safety bodies is reduced. Here, the impact energy is converted at least in part under execution of controlled work of deformation at the motor vehicle body-in-white and/or at the accident safety bodies, until the accident safety bodies contact one another directly.

When the predetermined distance has been fully cancelled on account of the impact or already before this, the accident safety bodies are caught mutually by means of a catch element, thus blocking the accident safety bodies from avoiding each other. To this end, at least one of the accident safety bodies comprises such a catch element, which corresponds to the corresponding other of the accident safety bodies.

During the further course of the impact or accident, at least a further part of the impact energy is converted by performing controlled work of deformation at accident safety bodies caught on one another. Since the accident safety bodies are caught on one another or blocked with one another by means of the catch element, it is ensured that an energy-absorbing axis of the accident safety device des not kink undesirably, whereby a particularly long, predefined deformation path is provided by the accident safety device as desired.

The advantages presented above in conjunction with the accident safety device according to the invention apply similarly for the motor vehicle according to the invention and also similarly for the method according to the invention and therefore will not be repeated here.

Further features of the invention are evident from the claims, the figures and the figure description. The features and feature combinations presented above in the description and also the features and feature combinations set forth hereinafter in the figure description and/or shown on their own in the figures are usable not only in the stated combinations, but also in other combinations or in isolation.

The invention will now be explained in greater detail on the basis of a preferred exemplary embodiment and with reference to the drawings.

BRIEF DESCRIPTION OF THE DRAWINGS

Like or functionally like elements are provided in the figures with like reference signs.

DETAILED DESCRIPTION OF THE DRAWINGS

Figure 1:
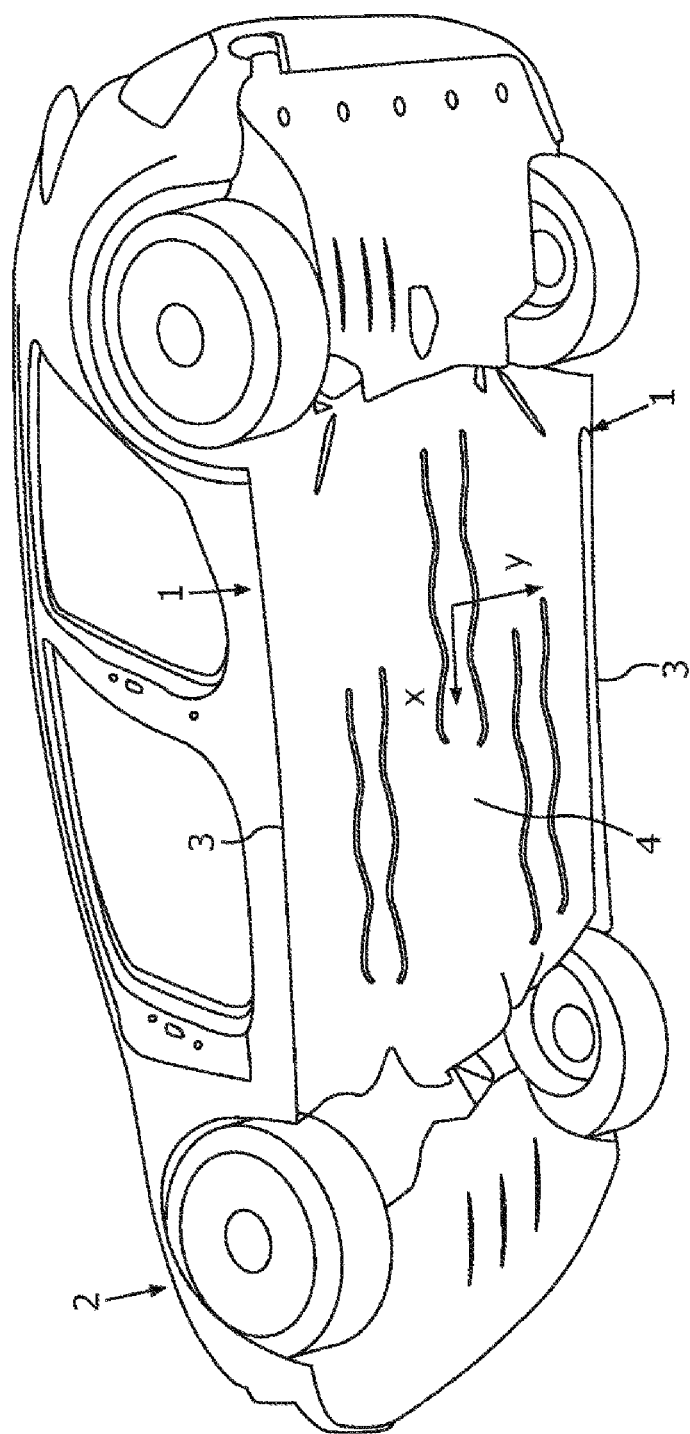
FIG. 1 is a schematic and perspective view of a motor vehicle with a trim element.

Hereinafter, an improved accident safety device 1, a motor vehicle 2 equipped therewith, and a method for the controlled conversion of impact energy by means of the accident safety device 1 will be described jointly.

The motor vehicle 2 has two sill covers 3 along a vehicle transverse direction y, which are spaced apart from each other over a vehicle width. This means that one of the sill covers 3 is arranged on the left side and the other of the sill covers 3 is arranged on the right side on the motor vehicle 2. Furthermore, the motor vehicle 2 has an underbody 4, on which there is arranged or fastened at least one underbody element 5 (shown for the first time in FIG. 3).

Figure 2:
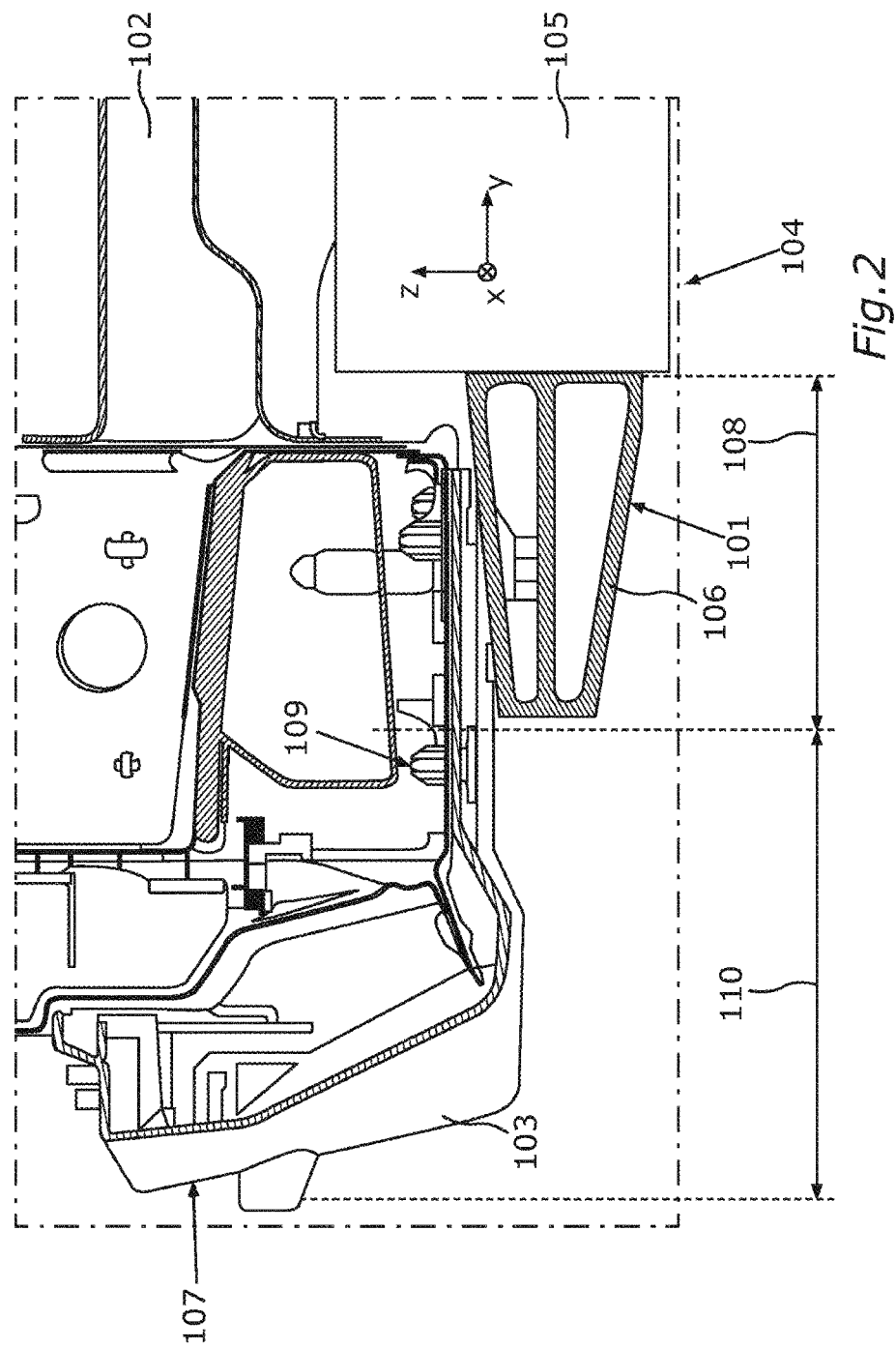
FIG. 2 is a sectional view of the motor vehicle with a conventional accident safety device.

FIG. 2 shows a sectional view of a conventional accident safety device 101, which is fastened to a conventional motor vehicle 102. The conventional motor vehicle 102 has a conventional sill cover 103 and a conventional underbody 104, to which there is fastened a conventional underbody element 105. The conventional accident safety device 101 has an accident safety element 106, which extends laterally in the vehicle transverse direction y, that is to say toward an outer side 107 or toward the sill cover 103 of the conventional motor vehicle 102. In the event of a side impact of the conventional motor vehicle 102, in which case the conventional sill cover 103 and a (not shown in FIG. 2) element of another entity involved in the accident impact against one another or on one another, a deformation path 108 is particularly small, since this is defined by the accident safety element 106, and extends merely as far as a fastening arrangement 109 of the conventional sill cover 103. If the accident safety element 106 were to extend further in the direction of the conventional sill cover 103 or further in the direction of the outer side 107 over the fastening arrangement 109, the fastening arrangement 109 would be covered by the accident safety element 106 and thus blocked. On account of this, a particularly long unusable path 110 is created, along which an impact energy of the impact or accident can be converted into work of deformation merely via the conventional sill cover 103 and/or via a body-in-white of the conventional motor vehicle 102.

Figure 3:
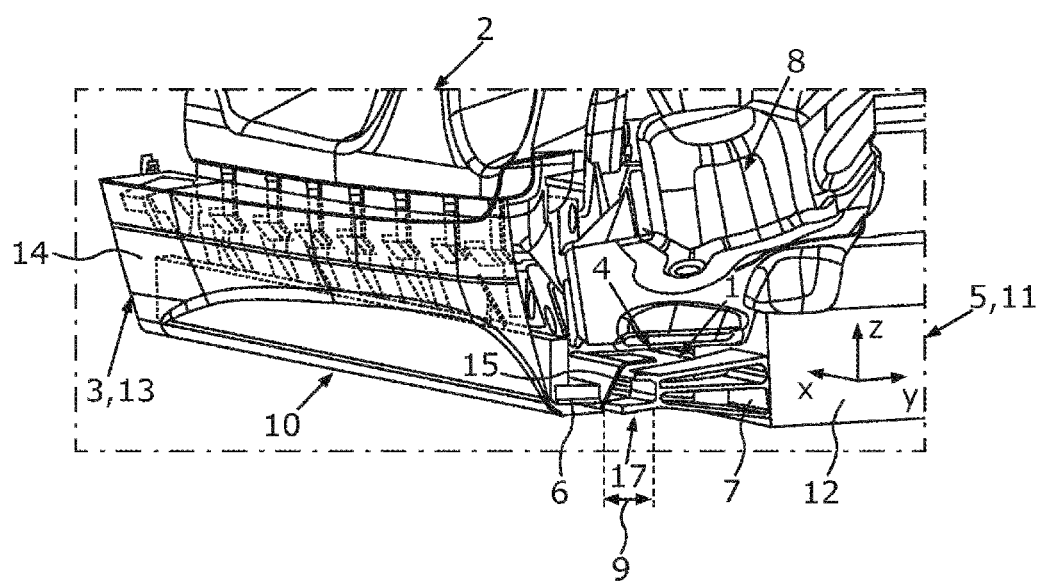
FIG. 3 is a perspective and sectional view of the motor vehicle with an improved accident safety device in comparison to the conventional accident safety device.

FIG. 3 shows a perspective and sectional view of the motor vehicle 2, which is equipped with the accident safety device 1 improved in comparison to the convention accident safety device 101. It can be seen that the (improved) accident safety device 1 has two separate accident safety bodies 6, 7, which can be arranged, and in the present example are arranged, on a motor vehicle body-in-white 8 of the motor vehicle 2. The two accident safety bodies 6, 7 in the present example are each in strip form and are held on the motor vehicle body-in-white 8 spaced apart from each other over a predetermined distance 9. Here, the two accident safety bodies 6, 7 run at least substantially parallel to a vehicle longitudinal direction x, wherein the distance 9 runs parallel to the vehicle transverse direction y. Furthermore, the two accident safety bodies 6, 7 are opposite one another or face one another and are arranged on a common outer side 10 of the motor vehicle 2.

Figure 4:
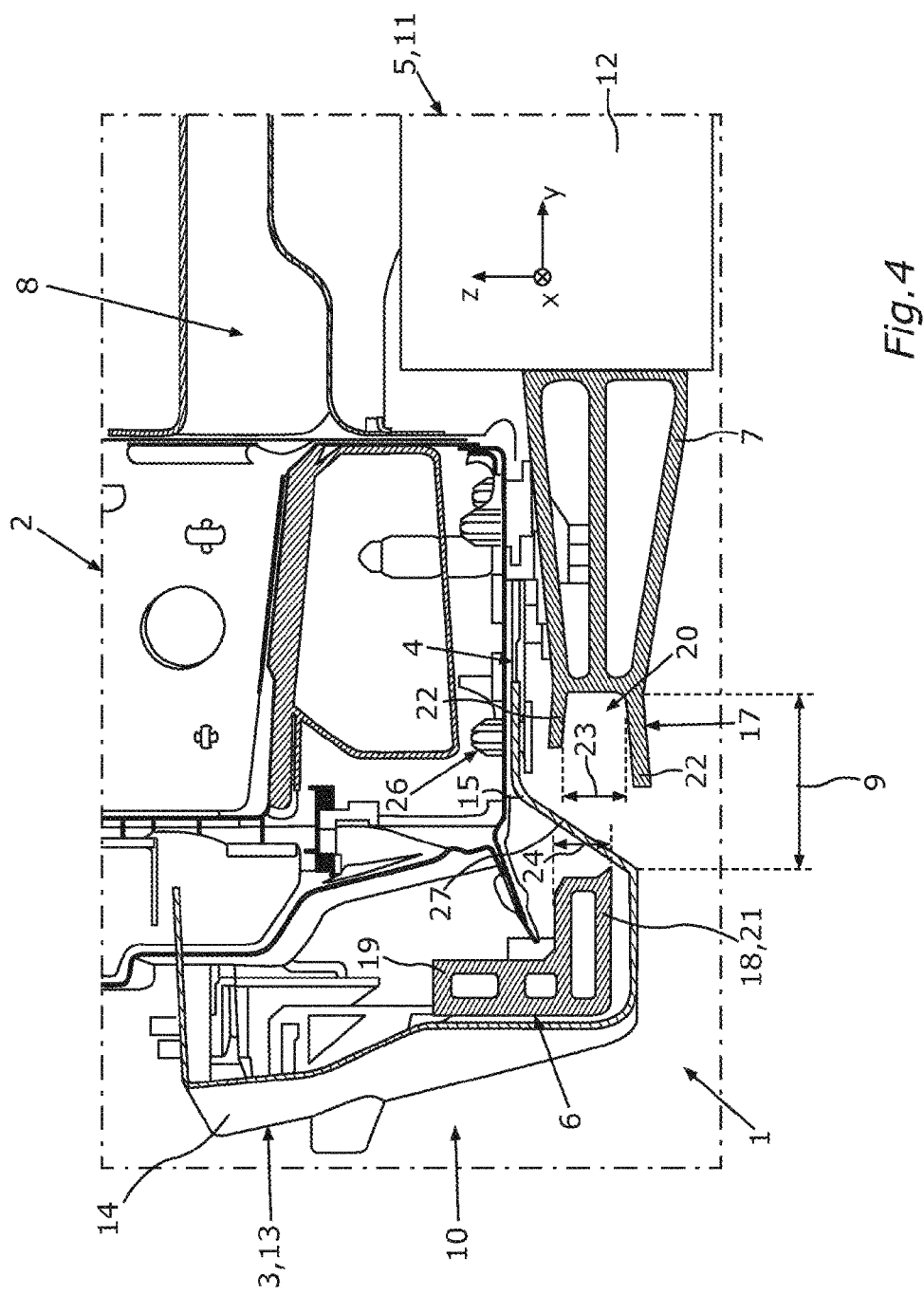
FIG. 4 is a sectional view of the motor vehicle with the improved accident safety device.

The motor vehicle 2, which in particular is formed as a passenger car, is electrically drivable or propellable. This means that the motor vehicle 2 has an electric energy storage unit 11, which comprises at least one (not shown) electric traction accumulator. Since the energy storage unit 11 is usually particularly heavy on account of the electric traction accumulator, at least the electric traction accumulator of the energy storage unit 11 is arranged on the underbody 4 of the motor vehicle 2, in order to ensure an advantageously particularly low center of gravity position of the motor vehicle 2. For this purpose, the electric energy storage unit 11 in the present example has a housing 12, which accommodates the electric traction accumulator and via which the latter is held on the underbody 4 of the motor vehicle 2. In this regard, the underbody element 5 is formed at least in part by the electric energy storage arrangement 11. As can be seen in FIG. 4, the accident safety body 7 fastenable to the underbody element 5 is arranged on or fastened to the housing 12 of the electric energy storage unit 11. This means that the accident safety device 1 at least in part forms a crash structure for the electric energy storage unit 11.

The sill cover 3 forms a trim element 13 of the motor vehicle 2, in particular of a side sill. In the present example, the accident safety body 6 is integrated in the trim element 13 or in the sill cover 3. Furthermore, the accident safety body 6 can be held on or can be fastened to the motor vehicle body-in-white 8 by means of the trim element 13 or by means of the sill cover 3. In the state as shown in FIG. 3, in which the accident safety device 1 is fastened to the motor vehicle body-in-white 8, the accident safety body 6 is thus held on or on or fastened to the motor vehicle body-in-white 8 via the sill cover 3. In this state, respective longitudinal axes x, transverse axes y and vertical axes z of the motor vehicle 2 and of the accident safety device 1 coincide with one another. The trim element 13 or the sill cover 3 comprises a first trim component 14 and a second trim component 15, which are fastened to one another, for example can be formed in one piece with one another. Here, one of the trim components 14, 15, in the present example the trim component 15, is fastened to the underbody 4 of the motor vehicle body-in-white 8, whereas the corresponding other trim component 14 is fastened to the motor vehicle body-in-white 8, in particular on the other side of the underbody 4, for example on a side wall. Therefore, the trim component 15 extends through between the two accident safety bodies 6, 7 arranged opposite one another or facing one another, so that the accident safety body 6 is arranged in a space enclosed by the motor vehicle body-in-white 8 and the trim element 13 or the sill cover 3. This in turn means that the accident safety bodies 6, 7 are separated from one another by means of the trim component 15.

So that the accident safety bodies 6, 7 do not avoid each other in the event of an accident of the motor vehicle 2 or in the event that the accident safety device 1 and an element 16 of another entity involved in the accident (see FIG. 6) impact against one another, the accident safety device 1 has a catch element 17, which is formed on one of the accident safety bodies 6, 7, in the present case on the accident safety body 7. The catch element 17 corresponds to the corresponding other of the accident safety bodies 6, 7, that is to say, in the present example the catch element 17 corresponds to the accident safety body 6. In this regard, the catch element 17 has a geometry and dimensions corresponding to, for example matching, at least a part of the accident safety body 6.

The catch element 17 will be described in greater detail hereinafter. For this purpose, FIG. 4 in the presented view shows the motor vehicle 2 with the improved accident safety device 1. It can be seen that the accident safety body 6 in cross-section has a first limb 18 and a second limb 19, which are arranged at right angles to one another and each run parallel to the vehicle longitudinal axis x. The accident safety body 6 corresponds to the catch element 17 in that the limb 18 has an outer contour which fits in a catch space 20 of the catch element 17. This means that the catch element 17 on the accident safety body 7 and a counter element 21 of the accident safety body 6, specifically its limb 18, correspond to one another in order to close a form fit between the accident safety bodies 6, 7. In other words, the limb 18 or the counter element 21 forms a first form-fit element, whereas the catch space 20 of the catch element 17 forms a second form-fit element. The form-fit elements are spaced apart from each other, for example via the predefined distance 9, so that the form fit is then not formed, at least not while the accident safety device 1 is not subjected to any impact. The catch space 20 is open on a side facing the opposite accident safety body.

In the present case, the catch space 20 or the catch element 17 has two catch walls 22 spaced apart from each other, which are spaced apart from each other in parallel over a distance 23 along the longitudinal axis x of the motor vehicle 2 or along a longitudinal axis x of the accident safety device 1. The distance 23 and a thickness 24 of the limb 18 or of the counter element 21 are the same, or the distance 23 is greater than the thickness 24. The catch walls 22 are furthermore arranged parallel to the limb 18 or to the counter element 21 or to the accident safety body 6.

Furthermore, the catch walls 22 are arranged at an incline to one another along a transverse axis y of the accident safety device 1 or along the transverse axis y of the motor vehicle 2. Therefore, the catch element 17 widens in the direction of the opposite accident safety body 6. In this regard, the catch space 20 widens in the direction of the accident safety body 6 so that the limb 18 of the accident safety body 6 is guided by the catch walls 22 when—for example in the event of the impact—the accident safety body 6 moves in the direction of the accident safety body 7 and plunges further into the catch space 20 via the open side thereof. Since the catch walls 22 taper toward one another in the transverse direction y, the catch walls 22 furthermore form a centering element, by means of which the accident safety body 6 and the accident safety body 7 can be centered on one another.

Due to the catch element 17, the two accident safety bodies 6, 7 are prevented from avoiding each other during an accident or impact of the motor vehicle 2. Since, in the event of the accident or impact, the accident safety bodies 6, 7 are moved towards one another, the limb 18 of the accident safety body 6 plunges into the catch space 20 of the catch element 17 on the accident safety body 7 and is guided by the catch walls 22 in relation to the accident safety body 7 and centered as appropriate and ultimately blocked with the accident safety body 7. Since the catch element 17 at least partially surrounds the limb 18 of the accident safety body 6 by means of the catch walls 22, the form fit is closed, thus preventing the accident safety bodies 6, 7 from avoiding each other. For example, a rotation of the accident safety body 6 about the vehicle longitudinal axis x is prevented on account of the form fit. Furthermore, a twisting or rotation of the accident safety body 6 about a vehicle vertical axis z and about the vehicle transverse axis y is likewise prevented. Here, it is assumed that, during the accident or impact, an impact force 25 (shown for the first time in FIG. 6) is exerted continuously on the accident safety device 1 or on the accident safety body 6.

In order to prevent the underbody element 5 or the housing 12 of the electric traction accumulator from having to be removed from the underbody 4 of the motor vehicle 2 and in order to be able to reach the fastening arrangement 26 normally for disassembly of the trim element 13 or the sill cover 3, in a further advantageous embodiment the trim element 13 in which the accident safety body 6 is integrated is formed in two parts. This means that the trim component 14 and the trim component 15 have been produced separately from one another and the trim components 14, 15 can be fastened to one another and released from one another reversibly without destruction, for example by means of a connection arrangement 27. This means that, in the state as shown in FIG. 4, wherein the accident safety device 1 together with the trim element 13 is fastened to the motor vehicle body-in-white 8, the trim components 14, 15 are then fastened reversibly to one another by means of the connection arrangement 27. Therefore, the trim components 14, 15 are releasable from one another without destruction, wherein "without destruction" means that there is no material separation or material machining, for example cutting or sawing. In this way, the trim component 15 can remain fastened to the motor vehicle body-in-white 8 for disassembly of the trim element 13 or the sill cover 3 and in particular of the accident safety body 6.

It can also be seen in FIG. 4 that a fastening arrangement 26, by means of which the trim element 13 or the sill cover 3 is fastened to the motor vehicle body-in-white, is covered at least in part by one of the accident safety bodies 6, 7, in the present case the accident safety body 7.

Figure 5:
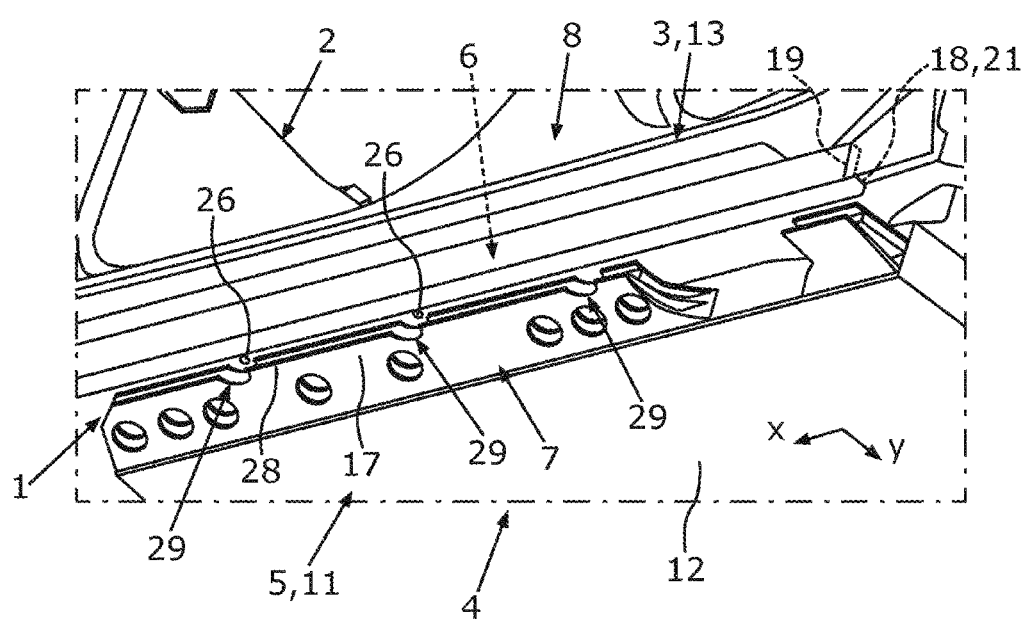
FIG. 5 is a schematic illustration of the motor vehicle with the improved accident safety device.

In this regard, FIG. 5 shows a schematic view of the motor vehicle 2 with the improved accident safety device 1, wherein the accident safety body 7 has auxiliary maintenance openings 29 on an outer edge 28. This means that the accident safety body 7 has, in the region of each fastening arrangement 26, the auxiliary maintenance opening 29 formed as a corresponding material recess. The fastening arrangement 26 is hereby reachable normally, for example by means of a tool head, without having to remove beforehand the accident safety body 7 or the underbody element 5 connected thereto from the underbody 4 of the motor vehicle body-in-shite 8. The accident safety device 1 is of a particularly maintenance-friendly design, since disassembly—and consequently replacement—of the trim element 13, of the sill cover 3, and/or of the accident safety body 6 is made possible particularly easily or with little effort.

The outer edge 28 is interrupted merely in regions by the auxiliary maintenance openings 29, so that the functionality of the accident safety device 1 is maintained.

Figure 6:
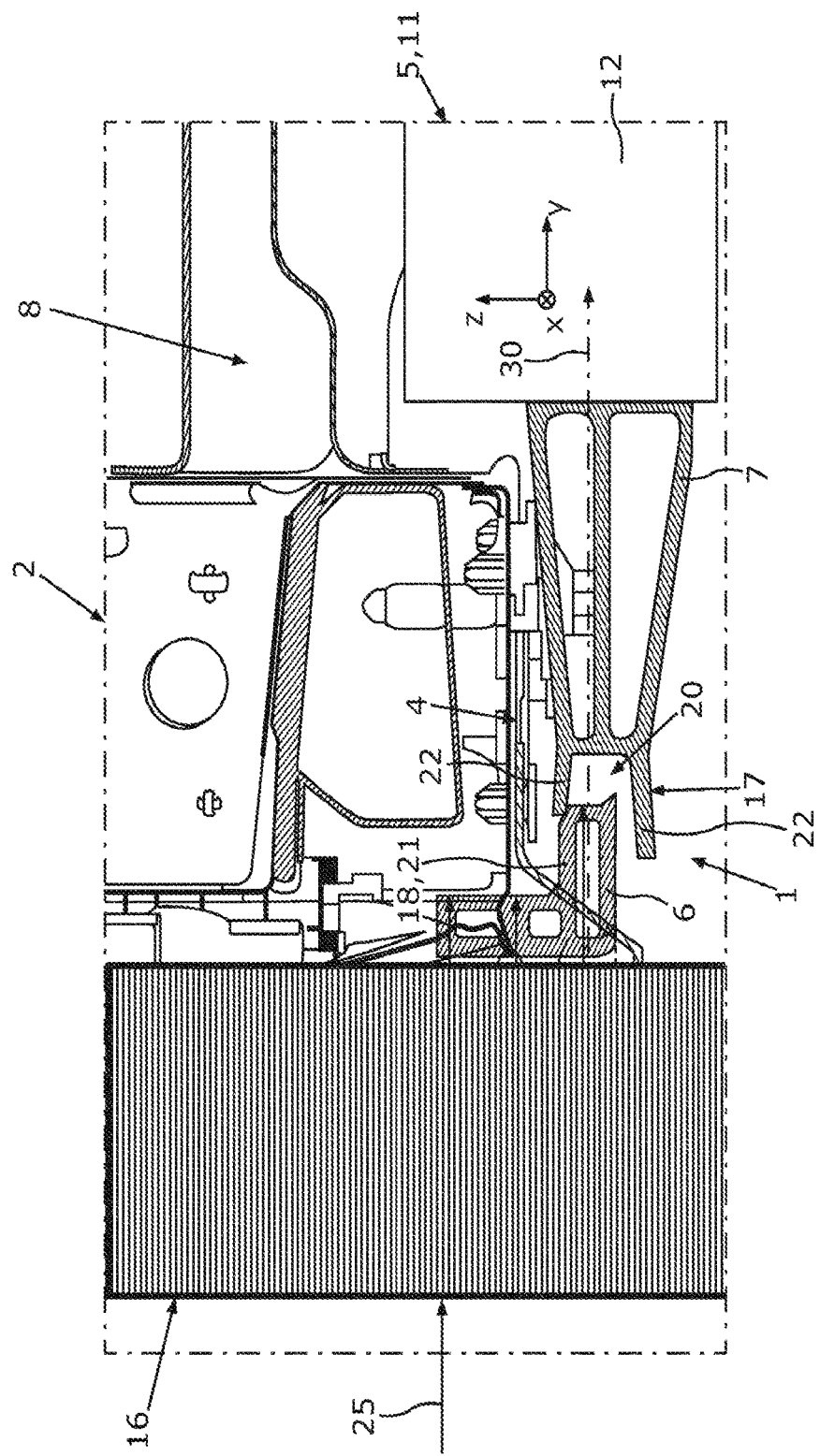
FIG. 6 is a schematic and sectional view of the motor vehicle with the improved accident safety device in the event of an accident.

Should the motor vehicle 2 equipped with the accident safety device 1 ultimately be involved in an accident, at least some of the impact energy will be able to be converted in a controlled manner into work of deformation by means of the accident safety device 1. In this regard, FIG. 6 shows a schematic and sectional view of the motor vehicle 2 with the improved accident safety device 1 in the event of an accident. Upon impact of the element 16 of another entity involved in the accident against the accident safety body 6, which in the present case is formed as an outer accident safety body, the impact force 25 is applied via the element 16 of another entity involved in the accident firstly to the trim element 13, which deforms on account of the impact force 25.

During the further course of the impact or collision against one another, the impact force 25 acts on the outer accident safety body 6, which is sufficiently hard or flexurally rigid so as not to be deformed immediately on account of the impact force 25. Instead, the outer accident safety body 6 is shifted, on account of the impact force 25 acting thereon, in the vehicle transverse direction y in the direction of the accident safety body 7, which in the present example forms an inner accident safety body. A corresponding direction of action of the impact force 25 is different from accident to accident, wherein there is a need, however, to reduce or absorb or convert the impact force 25, at least during the impact, along an energy absorption direction 30, which is predefined during production of the motor vehicle 2 or of the accident safety device 1. This energy absorption direction 30 is significantly determined, for example by an inner structure, an outer geometry, a material selection, etc. of the accident safety bodies 6, 7 and of the motor vehicle body-in-white 8.

In order to now ensure that, in the event of the impact, the accident safety bodies 6, 7 do not avoid each other, but instead move and/or deform at least substantially along the energy absorption direction 30, the accident safety device 1 has the catch element 17. In the event of the impact, the accident safety body 6 is moved further in the direction of the accident safety body 7 on account of the impact force 25 in order to overcome the distance 9, and therefore the accident safety body 6 plunges at least in part, in particular with its limb 18, into the catch space 20 of the catch element 17. As the accident safety body 6 moves, a first part of the impact energy or of the impact force 25 is already converted under execution of controlled work of deformation at the motor vehicle body-in-white 8, until the accident safety bodies 6, 7 contact one another directly, that is to say immediately.

If the limb 18 of the accident safety body 6 now plunges into the catch space 20 of the catch element 17, the limb 18 is oriented in relation to the accident safety body 7 on account of the inclined position of the catch walls 22, so that the accident safety body 6 is then already prevented from rotating, for example about the vehicle longitudinal axis x. The accident safety bodies 6, 7 are completely caught on one another or completely blocked with one another when the form fit between the accident safety bodies 6, 7 is fully closed. In this state, the limb 18 is plunged as far as possible into the catch space 20 of the catch element 17, so that the limb 18 is surrounded at least in part by the catch walls 22. Furthermore, the limb 18 is supported via a front face on a bottom face of the catch space 20, so that at the latest a rotation of the accident safety body 6 about the axes x, y, z is then blocked or prevented.

During the further course of the impact or accident, at least a further part of the impact energy or the impact force 25 is then converted in that controlled work of deformation, that is to say along the energy absorption direction 30, is executed at the accident safety bodies 6, 7 caught on one another or blocked with one another and/or at the motor vehicle body-in-white 8.

On the whole, the invention shows how accident safety of the motor vehicle 2, which in the present case is electrically drivable, can be improved, in particular by means of the accident safety device 1. The conflict of interest presented at the outset between a design of the accident safety bodies 6, 7, that is to say of the crash profile, that is particularly well optimized in respect of assembly/servicing and a particularly large lateral extent of the accident safety bodies is solved. The fundamental concept here is to divide the crash profile of the high-voltage store or of the electric traction accumulator into at least two constituents, specifically into the accident safety bodies 6, 7. In the present example the accident safety body 7 forms an inner part, which is fixed to the high-voltage store and which is configured such that the outer accident safety body 6 is caught at least in the vehicle vertical direction z. For this purpose, the accident safety body 7 is equipped with the catch element 17. Furthermore, the accident safety body 6 is integrated in the trim element 13 or in the sill cover 3. Here, the sill cover 3 is configured such that it nestles against the inner accident safety body 7, in particular against the catch element 17, in the event of a crash of the motor vehicle 2 or the accident safety device 1. In order to avoid any twisting of the accident safety body 6 about the vehicle longitudinal axis x, it is L-shaped in the present example, wherein, as a result of the limb 19, the accident safety body 6 and the element 16 of another entity involved in the accident come into contact with one another over a particularly large area, thus further counteracting the twisting of the accident safety body 6. The element 16 of another entity involved in the accident may be formed, for example, as a pole or post, wherein the corresponding motor vehicle accident is then referred to as a "pole impact". Furthermore, the outer accident safety body 6—as already mentioned—is sufficiently flexurally rigid or sufficiently hard to make a significant contribution to the conversion of the impact energy, in particular in the region of the auxiliary maintenance openings 29.

LIST OF REFERENCE SIGNS 1 accident safety device
2 motor vehicle
3 sill cover
4 underbody
5 underbody element
6 accident safety body
7 accident safety body
8 motor vehicle body-in-white
9 distance
10 outer side
11 energy storage unit
12 housing
13 trim element
14 trim component
15 trim component
16 element of another entity involved in an accident
17 catch element
18 limb
19 limb
20 catch space
21 counter element
22 catch wall
23 distance
24 thickness
25 impact force
26 fastening arrangement
27 connection arrangement
28 outer edge
29 auxiliary maintenance opening
30 energy absorption direction
101 conventional accident safety device
102 conventional motor vehicle
103 conventional sill cover
104 conventional underbody
105 conventional underbody element
106 accident safety element
107 outer side
108 deformation distance
109 fastening arrangement
110 unusable distance
x longitudinal axis
y transverse axis
z vertical axis

The invention claimed is:

1. An accident safety device for a motor vehicle, comprising:
    two separate accident safety bodies which are spaced apart from each other by a predetermined distance and are fastenable opposite each other to a motor vehicle body-in-white, wherein
    one of the accident safety bodies is fastenable to an underbody element of the motor vehicle body-in-white,
    another of the accident safety bodies has a catch element which corresponds to the one accident safety body and is configured to block the two separate accident safety bodies from avoiding each other in an event of an accident of the motor vehicle, and
    when spaced apart from each other by the predetermined distance, the one accident safety body is external to a catch space defined by the catch element of the another of the accident safety bodies.

2. The accident safety device according to claim 1, wherein
    the accident safety body fastenable to the underbody element is configured to be fastenable to a housing of an electrical energy storage unit of the motor vehicle body-in-white.

3. The accident safety device according to claim 1, wherein
    the catch element on the other accident safety body and a counter element of the one, opposite, accident safety body correspond to one another to close a form fit between the two accident safety bodies.

4. The accident safety device according to claim 1, wherein
the catch element has two spaced-apart catch walls, which are spaced apart from each other along a longitudinal axis of the accident safety device parallel to one another at a distance corresponding at least to a thickness of a limb of the one, opposite, accident safety body, and which are arrangeable parallel to the limb.

5. The accident safety device according to claim 4, wherein
the two spaced-apart catch walls are arranged obliquely to one another along a transverse axis of the accident safety device, so that the catch element is widened in the direction of the one, opposite, accident safety body.

6. The accident safety device according to claim 1, wherein
at least one of the two accident safety bodies has auxiliary maintenance openings on at least one of its edges.

7. The accident safety device according to claim 1, wherein
one of the two accident safety bodies is held on the motor vehicle body-in-white via a trim element.

8. The accident safety device according to claim 7, wherein
the trim element is a sill cover.

9. The accident safety device according to claim 7, wherein
the trim element comprises two trim components, which are fastenable to one another reversibly without destruction by way of a connection arrangement of the trim element.

10. A motor vehicle, comprising:
an accident safety device, which comprises two separate accident safety bodies, which are spaced apart from each other via a predetermined distance and are fastened opposite one another to a motor vehicle body-in-white, wherein
one of the two accident safety bodies is fastened to an underbody element of the motor vehicle body-in-white,
another of the two accident safety bodies comprises a catch element, which corresponds to the one accident safety body and is configured to block the two accident safety bodies from avoiding each other in an event of an accident of the motor vehicle, and
when spaced apart from each other by the predetermined distance, the one accident safety body is external to a catch space defined by the catch element of the another of the accident safety bodies.

11. A method for controlled conversion of impact energy into work of deformation by use of an accident safety device in an event of an impact of the motor vehicle, the method comprising the steps of:
receiving a collision of an element belonging to another entity involved in an accident with an outer accident safety body of the accident safety device;
displacing in translation the outer accident safety body in a direction of an opposite accident safety body of the accident safety device, whereby a predetermined distance separating the accident safety bodies is reduced;
mutually catching the accident safety bodies via a catch element, thus blocking the accident safety bodies from avoiding each other;
converting at least some of the impact energy by performing controlled work of deformation at the mutually caught accident safety bodies; and
wherein prior to displacing in translation the outer accident safety body in the direction of the opposite accident safety body of the accident safety device, the accident safety bodies are external to a catch space defined by the catch element.

* * * * *